April 8, 1958

J. G. JARVIS 2,829,693

STRAW CUTTER HAVING LONGITUDINALLY INCLINED ROTATING BLADES

Filed Nov. 16, 1955

Inventor
JAMES G. JARVIS by: J. Richard Cavanagh

April 8, 1958

J. G. JARVIS 2,829,693

STRAW CUTTER HAVING LONGITUDINALLY
INCLINED ROTATING BLADES

Filed Nov. 16, 1955

Inventor
JAMES G. JARVIS by: J. Richard Cavanagh

United States Patent Office 2,829,693
Patented Apr. 8, 1958

2,829,693

STRAW CUTTER HAVING LONGITUDINALLY INCLINED ROTATING BLADES

James Gordon Jarvis, Meadowvale, Ontario, Canada, assignor to Grasslander Co. Limited, Milverton, Ontario, Canada Application November 16, 1955, Serial No. 547,205

7 Claims. (Cl. 146—121)

This invention relates to apparatus for cutting straw and the like.

Up to the middle of the ninteenth century, various classes of mechanism having manually actuated chopping blades were used for chopping straw and like forage material against a chopping block or the like. One well known device embodied a rotating head carrying knives co-operating with a ledger plate or blade to shear the material being cut. Large radial shear blades are used at the present time. In the another form, shear blades were helically mounted as in a reel type lawn mower. In all cases, the shear blade moved past a ledger blade which was usually stationary.

In contrast to these methods which operated in accordance with a shear class of cutting principle, attempts were made to provide a series of radially mounted blades co-acting by pressure against a co-operating roller. Straw cutters of this type were operated manually. The blade pressed against the surface of the co-operating drum in the cutting action so that blade wear was considerable. Accordingly, devices embodying a shear class of cut were the most popular and have evolved by way of mechanical refinement to more general acceptance to-day.

With the introduction of the baling of feed, it became necessary to break up the bales. The older type of straw cutter fell into disuse and devices were developed for breaking up the bales for feed after storage. It was necessary to chop the baled material and a strong trend developed in the fine chopping of this material. Even saw cutting elements and the like have been used to reduce the material to fine size. One of the most efficient cutters for this purpose was a rotating blade to which the bale could be fed and which would co-act preferably in conjunction with a ledger blade to accomplish a shear cutting action. This general method of cutting is used for the cutting of feed material in the relatively modern system of feeding live-stock in which relatively freshly cut feed is chopped to a fine size after a short curing period for so-called direct feeding of livestock.

Experiments of applicant over a period of year have shown that the breaking up of feed substantially to a mulch or in any case into a mass of material having a large percentage of broken fibres, dust and the like, is unsatisfactory for feed purposes as compared with natural feed obtained by livestock in pasture. It has also been established that the older method abandoned substantially one hundred years ago, is highly satisfactory and represents the equivalent of pasture grazing in that the feed is chopped cleanly into approximately hand-sized lengths without crushing, breaking, bruising or powdering the feed.

In order to accomplish the desired chopping action, considerable investigation has shown that any of the shear cutting principles is substantially unsatisfactory by reason of the very great power demand required to operate a mechanism effecting severance of a body material by shearing action because the body must first be compressed before shearing occurs. In contrast, a pressure cutting principle requires substantially less power. It has been found, however, that prior manual pressure cutting devices while operative for a short time when power driven, are not adapted to accurate and essential resharpening and readjustment. Moreover, a longitudinally aligned rotatable pressure cutting blade as in all of the prior art, gives rise to a bump or vibration during cutting, making the mechanism somewhat impractical for power drive by reason of power fluctuation and loss occasioned thereby and undue wear and stress on supporting mechanism therefor such as bearings and the like.

It is accordingly the main object of the invention to provide cutting apparatus for feed or the like adapted to cut material in accordance with a pressure cutting principle as contrasted with a shear cutting principle and in which vibration is avoided by maintaining the cutting edge of the cutting blades out of contact with the cutting drum but in close spacing thereto.

It is another object of the invention to provide cutting apparatus for hay or the like in which the maximum cutting force or pressure occurs substantially at a point at any one time whereby to reduce the power required for cutting substantially to a minimum.

Other objects of the invention will be appreciated by the following specification taken in conjunction with the accompanying drawings.

In the drawings:

Figure 2 is an enlarged diagrammatic illustration of one preferred manner of cutting a shaft of feed material or the like;

Figure 1:
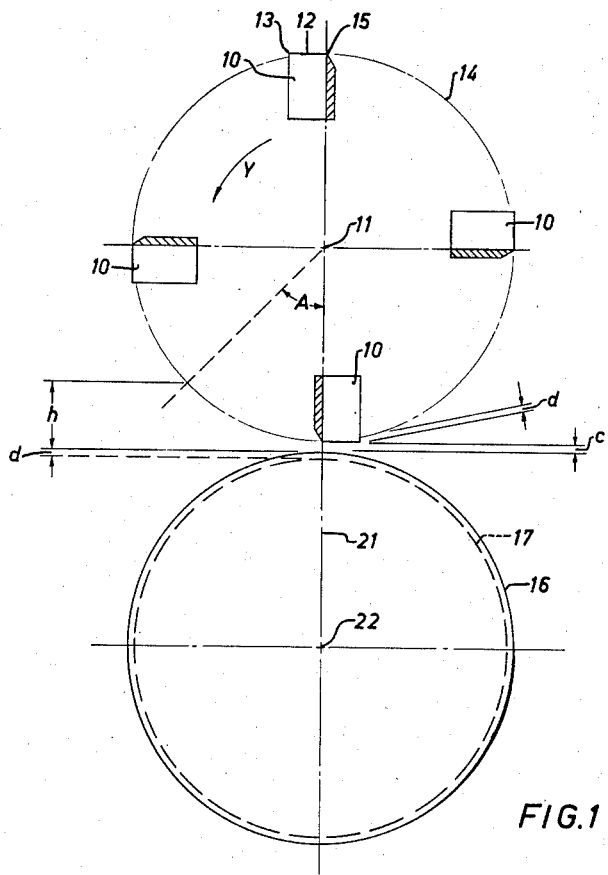
Figure 1 is a transverse sectional diagrammatic illustration of cutting blades of the invention adapted to co-act with a presure roller.

A pressure cutting principle as modified in accordance with the invention is illustrated diagrammatically in Figure 1 wherein a plurality of flat rectangular cutting blades 10 are inclined longitudinally with respect to their common rotary axis 11. The cutting edges 12 are straight and at their outward ends 13, generate a path of rotation of greater diameter than the path of rotation 14 of the mid-point 15 of each cutting edge. It will be realized, therefore, that the loci of various points along the cutting edges 12 during rotation of the blade will be on paths of different radii. It may be assumed, by way of example, that the blades rotate about the axis 11 in the direction of the arrow Y and that the maximum difference of radius of rotation of the points in the cutting edge may be represented by the dimension $d$.

The line 16 is intended to represent the surface of a co-operating pressure cutting element such as a roller adapted to coact with the blades 10 at the point 15 of the cutting edge thereof. The inner line 17 represents the line of a surface of the co-operating roller or the like opposite the points 13 of the cutting blades and accordingly differs in radius by the dimension $d$ from the radius of the line 16. The dimension $c$ represents a minimum clearance spacing between the surface of the co-operating pressure cutting element and a blade cutting edge.

Figure 2:
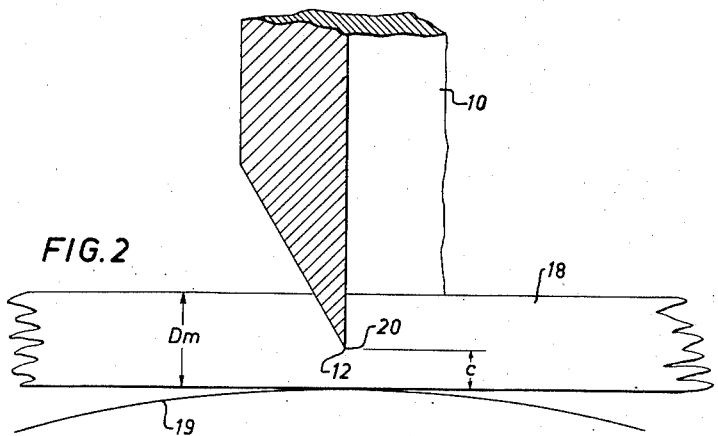

It will be apparent that material such as a shaft 18 of straw or the like of mean diameter $D_m$ shown in Figure 2 passing between the blade 10 and a co-operating pressure cutting element 19, is subjected substantially at a point 20 at spacing $c$ along the cutting edge of the blade 12 to a partial pressure cut sufficient to effectively sever the shaft while other points in the blade are spaced at a greater distance from the co-operating element 19 due to the longitudinal inclination of the blade 10. By this means, the pressure required for the cutting of a substantial amount of material is reduced to that necessary for the cutting of a small number of shafts impinged between only that part of the cutting blade which is in closest proximity to the co-operating element or roller 19. By this means also, the application of pressure to effect the necessary cutting action is prolonged through an arc of rotation of the blades which may be substantial, whereby to avoid vibration and to effect a smooth low power cutting action.

It has been determined that the power to drive a mechanism suitable for cutting straw as hereinafter set forth in more detail, is much more dependent upon the friction of the mechanism of associated conveyors and the like than upon the power consumption required to effect the necessary cutting action. In this respect, it is preferred that the crushing of straw or other feed be avoided. To obviate the crushing and bruising of material, it is preferred that the material fed to the cutting knives 10 be conveyed substantially freely at a depth substantially equaling the height $h$ at which the blade makes an angle $A$ approximately equal to 45 degrees relative to a theoretical line 21 joining the axis of rotation 11 of the blades 10 and the axis of rotation 22 of the co-operating pressure cutting element 19. Accordingly, most of the material is cut before the cutting edge arrives at minimum spacing $c$ at which the remainder is effectively severed though the cutting edge does not engage the pressure supporting surface and is thus substantially free from wear.

Figure 3:
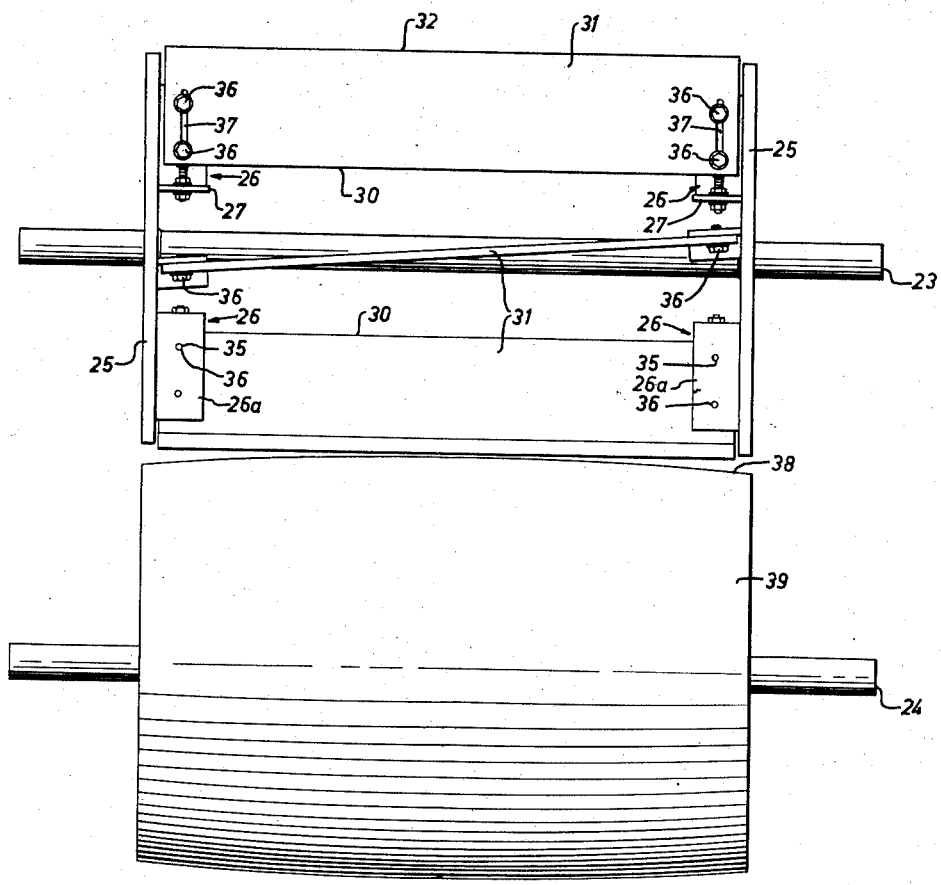
Figure 3 is an elevation of a preferred form of cutting apparatus of the invention.
Figure 5:
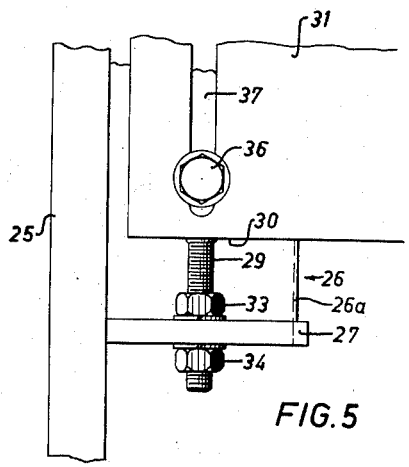
Figure 5 is an enlarged partial view of a preferred manner of mounting a blade for operation according to the invention.
Figure 4:
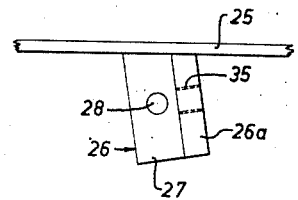
Figure 4 illustrates a plan view of a blade supporting fitting for the blades of the apparatus of Figure 3.

A suitable and preferred form of mechanical construction of cutting apparatus according to the invention is shown in Figures 3 to 5 and comprises the parallel spaced apart shafts 23 and 24 wherein shaft 23 carries supporting means 25 including brackets 26 welded thereto and having a supporting flange 26a inclined longitudinally preferably at an angle of about five degrees as shown in Figure 4 and having an inner flange 27 with a hole 28 adapted to accommodate the adjusting bolt 29 butt-welded to the inner edge 30 at each end of each cutting blade 31. The distance of the cutting edge 32 from the axis of shaft 23 is controlled by adjustment of the nuts 33 and 34 adapted to lock the bolt 29 with respect to the flange 27. Each bracket 26 embodies a pair of threaded holes 35 adapted to accommodate locking bolts 36 which pass through a slot 37 near each end of the blade to clamp the blade securely in the bracket after adjustment of the bolt 29. Assuming that each end of each blade is adjusted to rotate on the same radius, the cutting edges 32, if straight as preferred herein, will, upon rotation, generate a surface defining the matching contour of the co-operating surfaces 38 of the co-operating pressure roller 39. It will be observed that the outer surfaces 38 of roller 39 are shown as of matching contour of greater diameter in the mid region than at the outward edges and may be described herein as possessing longitudinal convexity, though of generally cylindrical form.

The adjustment of the blades as set forth, enables the operation of the cutting apparatus of the invention in such manner that the cutting edges do not touch the surfaces 38 of the co-operating roller 39. Thus, referring again to Figure 2, it will be observed that the cutting edge at the point 20 does not penetrate through the full dimension of the shaft of material 18 but only partially therethrough. Thus, for example, in the cutting of straw, it has been found that a clearance of about one-hundredth of an inch will effect satisfactory penetration of even the material adapted to be cut only at a point of closest relationship between the cutting blade and the co-operating roller 19. It has been found that highly satisfactory performance may be accomplished by a spacing of three one-thousandths of an inch with the obvious advantage that neither the cutting edge of the blade nor the surface of the roller can be worn by mutual engagement. Therefore, the life of the cutting edge of each blade and the roller surface is substantial and enables the cutting principle to be applied in a practical sense in service. It has been found that a cutting edge operating in the spaced manner specified will, unless damaged by the action of foreign bodies such as stones and the like, serve for substantially a full season without resharpening.

While the invention has been disclosed in one practical form having a straight or flat cutting blade with a straight cutting edge, which latter is preferred to permit accurate resharpening thereof, it will be understood that as long as the surfaces of the cooperating pressure cutting element or support, i. e., the roller, match with that defined by the path of the cutting edges of the blades during rotation, the necessary co-action between the blades and pressure cutting support or element therefor will be accomplished.

What I claim as my invention is:

1. Apparatus for cutting straw and like forage material comprising in combination: a straight flat surfaced elongated rectangular pressure cutting blade having supportable ends; a straight cutting edge extending longitudinally of said blade; means supporting said blade for rotation about an axis with the cutting edge thereof disposed outwardly; means forming a part of said supporting means disposing the geometric plane of the flat surface of said rectangular plate at an angle of longitudinal inclination with respect to a geometric plane passing through said axis of rotation, said planes intersecting substantially along a common radius line substantially midway between the terminal ends of the cutting edge, the terminal ends of said edge being located equidistant from said axis; a pressure cutting co-operating member adapted for motion about an axis parallel to the rotational axis of said cutting blade, the path of said cutting edge during rotation of said blade about said axis being of predetermined contour determined by the longitudinal inclination of said cutting edge relative to the rotational axis thereof; and a pressure cutting supporting surface on said co-operating member having a contour matching with the contour of said path for co-operation with said cutting edge in severing material impinged therebetween.

2. Apparatus for cutting straw and like forage material comprising in combination: a straight elongated rectangular pressure cutting blade having supportable ends; a straight cutting blade extending longitudinally on said blade; means supporting said blade for rotation about an axis with the cutting edge thereof disposed outwardly and longitudinally inclined with respect to said axis; means locating the ends of said blade equidistant from said axis; a pressure cutting co-operating member adapted for motion about an axis parallel to the rotational axis of said cutting blade, the path of said cutting edge during rotation of said blade about said axis being of predetermined contour determined by the longitudinal inclination of said cutting edge relative to the rotational axis thereof; and contoured pressure cutting supporting means on said co-operating member having a contour matching with the contour of said path for co-operation with said cutting edge in severing material impinged therebetween.

3. Apparatus for cutting straw and like forage material comprising in combination: a straight elongated rectangular pressure cutting blade; a cutting edge extending longitudinally of said blade; means adjustably supporting said blade for rotation about an axis with the cutting edge thereof disposed outwardly and longitudinally inclined with respect to said axis, to adjustably locate the terminal ends of said edge equidistant from said axis at a predetermined longitudinal inclination; a pressure cutting co-operating member in the form of a drum adapted for rotation about an axis parallel to the rotational axis of said cutting blade, the path of said cutting edge during rotation of said blade about said axis being of predetermined contour determined by the longitudinal inclination of said cutting edge relative to the rotational axis thereof; and a contoured pressure cutting supporting surface on said co-operating member having a contour matching with the contour of said path for co-operation with said cutting edge in severing material impinged therebetween.

4. Apparatus for cutting straw and like forage material comprising in combination: a rotatable cutter shaft; supporting means extending radially outwardly from said shaft and spaced longitudinally of the latter; brackets on each supporting means each having a supporting flange extending in a direction toward the other supporting means but inclined longitudinally with respect to the rotational axis of said shaft; a straight elongated rectangular pressure cutting blade mountable between said supporting means on said brackets thereof in engagement with the supporting flanges of said brackets and having an outwardly directed cutting edge; means for adjusting said pressure cutting blade to dispose the outwardly directed cutting edge thereof equidistant at the terminal ends of the latter from the rotational axis of said shaft; means for removably clamping said blade to said brackets; a pressure cutting co-operating member adapted for motion about an axis parallel to the rotational axis of said cutting blade, the path of said cutting edge being of predetermined contour determined by the longitudinal inclination of said cutting edge; and a pressure cutting supporting surface on said co-operating member having a contour matching with the contour of said path for co-operation with said cutting edge in severing material impinged therebetween.

5. Apparatus for cutting straw and like forage material comprising in combination: two parallel spaced apart support elements having a common axis of rotation; means on each element including an angular blade clamping surface contained in a theoretical plane intersecting said axis substantially midway between said elements; means relatively fixing said elements for rotation about said axis to substantially align the clamping surfaces thereof in said plane; a straight elongated rectangular cutting blade having a straight cutting edge extending substantially the full length thereof; means clamping the end portions of said blade against said clamping surfaces to substantially align said blade in said plane to dispose the ends of the cutting edge equidistant and remote from said axis; a rotatable pressure drum having an axis of rotation parallel to said common axis; and a pressure cutting supporting surface on said drum of a contour adapted to co-operate upon rotation of said blade on said support elements about said common axis with a portion only of said cutting edge during any cutting instant to effect a maximum cutting pressure on material impinged therebetween.

6. Apparatus for cutting straw and like forage material comprising in combination: two parallel spaced apart support elements having a common axis of rotation; means on each element including an angular blade supporting surface contained in a theoretical plane intersecting said axis substantially midway between said elements; a straight elongated rectangular cutting blade having end portions; a straight cutting edge extending substantially the full length of said cutting blade; means adjustably clamping the end portions of said blade to said supporting surfaces to substantially align said blade in said plane and the cutting edge thereof in longitudinal angular relationship with said axis; a pressure supporting drum adapted for rotation about an axis parallel to the rotational axis of said support elements; and a pressure cutting supporting surface on said drum of a contour adapted to co-operate with said cutting blade to pressure cut material impinged therebetween.

7. Apparatus for cutting straw and like forage material comprising in combination: two parallel spaced apart support elements having a common axis of rotation; bracket means on each element including an angular blade supporting surface contained in a theoretical plane intersecting said axis substantially midway between said elements; means fixing said bracket means on said element for rotation about said axis to substantially align the supporting surfaces thereof in said plane; a straight flat elongated rectangular cutting blade having end portions; a straight cutting edge extending substantially the full length of said cutting blade; means adjustably clamping the end portions of said blade to said supporting surfaces to substantially align said blade in said plane and the cutting edge thereof in longitudinal angular relationship with said axis; a pressure supporting drum adapted for rotation about an axis parallel to the rotational axis of said support elements; and a pressure cutting supporting surface on said drum of a contour adapted to co-operate with said cutting blade to pressure cut material impinged therebetween.

References Cited in the file of this patent
UNITED STATES PATENTS

| None | Green | Aug. 8, 1833 |
| 61,932 | Gale | Feb. 12, 1867 |
| 1,867,884 | Huff | July 19, 1932 |
| 2,224,948 | Bloomquist | Dec. 17, 1940 |
| 2,399,529 | Willits | Apr. 30, 1946 |
| 2,545,520 | Kinkead | Mar. 20, 1951 |

FOREIGN PATENTS

| 22,978 | Finland | Jan. 27, 1949 |

UNITED STATES PATENT OFFICE

CERTIFICATE OF CORRECTION

Patent No. 2,829,693

April 8, 1958

James Gordon Jarvis

It is hereby certified that error appears in the above numbered patent requiring correction and that the said Letters Patent should read as corrected below.

In the grant, lines 2 and 3, for "assignor to Grasslander Co. Limited, of Milverton, Ontario, Canada," read -- assignor, by mesne assignments, to Grasslander (1957) Limited, of Milverton, Ontario, Canada, --; line 12, for "Grasslander Co. Limited, its successors" read -- Grasslander (1957) Limited, its successors --; in the heading to the printed specification, lines 4 to 6, for "assignor to Grasslander Co. Limited, Milverton, Ontario, Canada" read -- assignor, by mesne assignments, to Grasslander (1957) Limited, Milverton, Ontario, Canada --.

Signed and sealed this 18th day of November 1958.

(SEAL)

Attest:

KARL H. AXLINE
Attesting Officer

ROBERT C. WATSON
Commissioner of Patents